United States Patent [19]

Wedel et al.

[11] Patent Number: 4,647,269
[45] Date of Patent: Mar. 3, 1987

[54] AUTOMATIC INTEGRATED CIRCUIT TRANSPORTATION TUBE ELEVATING AND TILTING DEVICE

[75] Inventors: John A. Wedel, Mendota Heights; Michael J. Carroll, Columbia Heights; Michael P. Kassner, New Brighton; Nathan R. Smith, Stillwater, all of Minn.

[73] Assignee: Micro Component Technology, Inc., St. Paul, Minn.

[21] Appl. No.: 750,259

[22] Filed: Jul. 1, 1985

[51] Int. Cl.⁴ .............................................. B65G 65/34
[52] U.S. Cl. .................................... 414/421; 221/11; 414/403
[58] Field of Search .................. 209/571, 573; 29/741; 221/11, 236; 324/73 AT, 158 F; 414/403, 413, 421, 422

[56] References Cited

U.S. PATENT DOCUMENTS

| | | | |
|---|---|---|---|
| 4,008,826 | 2/1977 | Carree | 221/236 X |
| 4,222,166 | 9/1980 | Kurek et al. | 29/741 X |
| 4,401,234 | 8/1983 | Droira et al. | 29/741 A |
| 4,436,619 | 3/1984 | Petrov et al. | 209/573 |
| 4,500,246 | 2/1985 | Janisiewicz et al. | 414/403 X |

FOREIGN PATENT DOCUMENTS 2538932 7/1984 France ................................ 414/422
58-96258 6/1983 Japan ............................... 324/158 F

OTHER PUBLICATIONS

"Chip Handler Apparatus for Testing Semiconductor Devices", M. Fromer, M. A. Schorr, Z. Segal & T. Welnicki, *IBM Technical Disclosure Bulletin*, vol. 20, No. 3, Aug. 1977, pp. 1100–1101.

*Primary Examiner*—Robert B. Reeves
*Assistant Examiner*—Edward M. Wacyra
*Attorney, Agent, or Firm*—Lawrence M. Nawrocki

[57] ABSTRACT

The invention of the present document comprises apparatus for receiving and automatically feeding dual-in-line package (DIP) transportation and storage tubes (24) to the singulator (76) of an integrated circuit device handler (20) so that devices (22) in the tubes (24) can be introduced at the singulator (76). The tubes (24) are randomly placed in a hopper (66), and conveyed through an aperture (170) formed in a side wall (172) of the hopper (66). An elevator (74) is provided to raise the tubes (24) to a height at which open ends thereof are disposed above the height of the singulator (76). With a tube (24) so raised, a tube inserter (96) pushes the tube (24) into the tube holder (98) of a manipulator (100). The tube holder (98) is, in turn, pivoted to tilt the tube (24) so that devices (22) within the tube (24) are deposited for introduction into the singulator (76).

18 Claims, 13 Drawing Figures

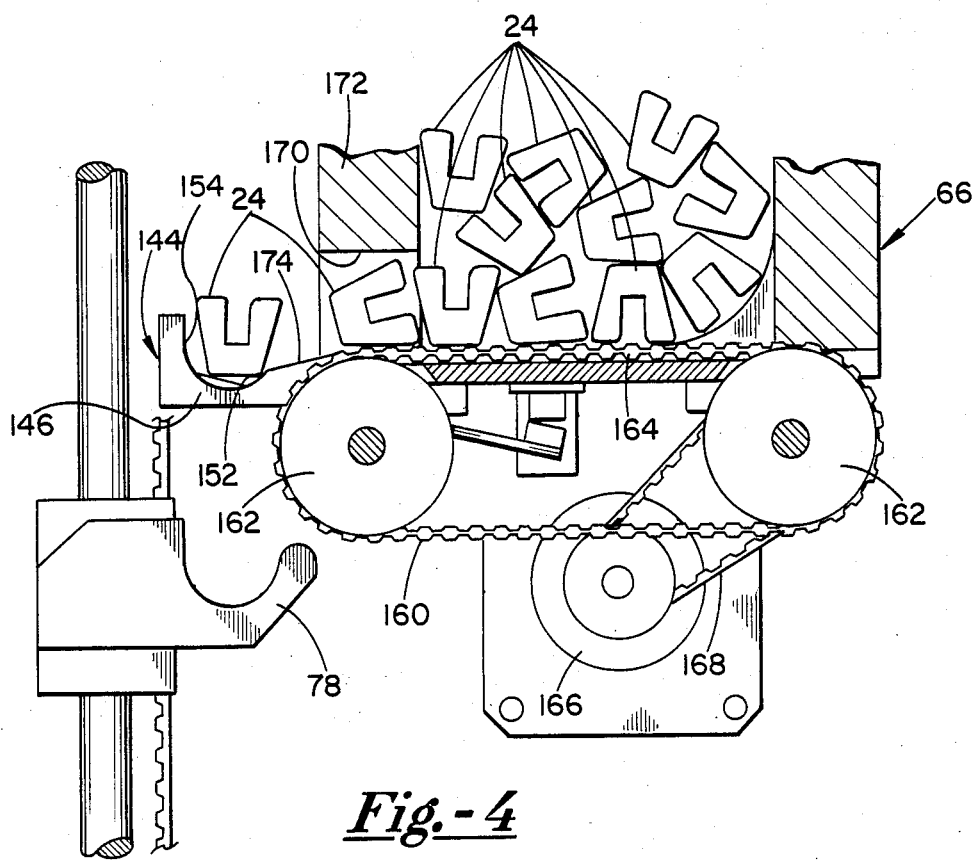
_Fig.-4_
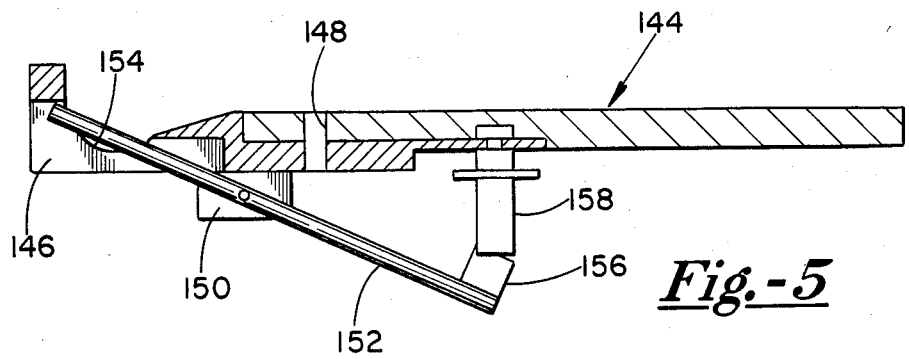
_Fig.-5_

AUTOMATIC INTEGRATED CIRCUIT TRANSPORTATION TUBE ELEVATING AND TILTING DEVICE

TECHNICAL FIELD

The invention of the present document deals broadly with the field of electronics and semiconductors. More narrowly, the invention is related to the field of handlers for maneuvering integrated circuit devices, and particularly dual-in-line packages (DIPs), into engagement with contacts at a test site so that the circuits can be evaluated for the proper performance characteristics. The invention specifically relates to apparatus for accepting transportation tubes in which DIPs are stored, maneuvering those tubes to a position at which the devices to be tested in the tubes can be emptied from the tubes into a chute or chutes regulated by a singulation device for isolating individual of the integrated circuit devices to be tested, and emptying the individual devices to be tested from the transportation tubes.

BACKGROUND OF THE INVENTION

The electronics revolution which has occurred in recent years has been occasioned by the development of the semi-conductor. Integrated circuit devices have impacted significantly upon the consumer, industrial, governmental, and defense markets.

In many of the applications to which such electronic components are put, it is essential that they be 100 percent accurate in their operation and that all portions of the component function properly. In other applications, however, an IC may not require as close tolerances as are necessary in more sophisticated applications and may not need be completely functional in all circuitry paths.

For various reasons, the manufacturing process for integrated circuits, as in the case of other manufacturing processes, will produce units of different quality. For this reason, it is necessary to test the units not only to answer the relatively unsophisticated question of whether they are operable or not, but also to classify the units by degree of operability and quality. The best units can be used in applications wherein close tolerances and accuracy are essential. Those of lesser quality and integrity still might, however, be able to be used in other less demanding applications.

To this end, various high speed testing devices have been developed in order to ascertain the quality of function and integrity of various integrated circuit devices. Typically, such testers can perform testing upon in excess of three units per second. It is, therefore, necessary to provide handling equipment capable of feeding units to the test site and conveying those units away from the test site at at least as rapid a rate.

One particular type of integrated circuit is known as a dual-in-line package (DIP). With DIPs, as with other integrated circuit packages, a particularly important phase of the device handling is one wherein individual devices to be tested are emptied from tubular structures in which they are stored onto tracks in a magazine for subsequent feeding to a test site. DIPs are maintained in transportation and storage tubes in which they are aligned end to end, each of opposite ends being closed by an appropriately constructed pin. Handling, as presently known in the art, incorporates the manual emptying of devices in such a tube onto a track within the magazine. This is accomplished by removing a pin at one end of the tube, substantially aligning the open end with an upper end of an inclined track within the magazine, and tipping the tube so that the devices will pass out therefrom and onto the track with which the tube is aligned. As can be seen, therefore, the time involved in loading the magazine of the handler, although not slow when thought of in most contexts, is limiting when one considers the particular application to which the equipment with regard to which the present invention is employed.

It is to these problems in the prior art that the invention of the present document is directed. The present invention is an apparatus for bulk feeding DIP transportation and storage tubes having a first, elevated end thereof opened, to a mechanism for singulating the devices stored therein and emptying the devices from the tube. All of these functions are performed automatically without requiring the benefit of operator intervention other than the opening of the tubes at one end and placing them in a hopper with open ends positioned above opposite ends of the sticks.

SUMMARY OF THE INVENTION

The present invention is an apparatus which automatically feeds DIP integrated circuit transportation tubes into communication with a singulator mechanism which regulates passage of the DIPs in the tubes into a chute down which the DIPs pass to a test site. At the test site, the DIPs are interfaced with an electronic tester mechanism. The apparatus includes a hopper in which one or more of the tubes can be placed. The floor of the hopper would be oriented so that one of the ends (an open end) of each tube, when the tube is positioned on the floor of the hopper, would be disposed above the closed end. The hopper would include means to afford egress from the hopper proximate the bottom thereof. The invention further includes means, spaced laterally from the hopper, for elevating one of the tubes to a height at which its open end is above a singulator mechanism to which the DIPs in the tube are to be fed. Means are incorporated for urging a tube from the hopper to the means by which the tube is elevated. Finally, the apparatus includes means for receiving a tube elevated to the height at which its open end is positioned above the singulator. The receiving means further performs a tilting function to angle the tube so that DIPs transported therein are allowed to pass to the singulator.

A preferred structure in accordance with the invention can utilize a pair of cradles, each cradle having a concave receptacle formed therein to receive a tube, at a location along its length, within the receptacle. In order to maintain the DIPs within the tube, a cradle receiving the tube closer to its open end would be spaced vertically upwardly from the other cradle in order to maintain the tube in an oblique disposition.

The means by which tubes are translated from the hopper to the location for pick-up by the dual cradle elevator can comprise an endless belt or belts, an upper run of which would define a portion of the floor of the hopper. Egress from the hopper can be provided through an aperture at the floor and having a vertical dimension sufficient to allow a typically sized DIP tube to pass therethrough. Such a belt or belts can be rotated to urge one of the tubes randomly deposited in the hopper through the egress aperture and to a location at which the dual cradle elevator can pick the tube up.

A structure made in accordance with the invention can include at least one pick-up receptacle in vertical alignment with the path of movement of the elevator cradles. When such a receptacle is provided, the endless belt or belts would deposit the tube translated from the hopper into the receptacle. Sensing means could be provided to ascertain that a tube is positioned within the pick-up receptacle and to initiate upward movement of the elevator to lift the tube from the pick-up means.

Typically, a DIP storage tube has a generally trapezoidal cross-section with a center of gravity closer to a shorter of parallel sides defined by the cross-section. A concavity or concavities formed in the pick-up receptacle and/or the elevator cradles would tend to dispose the tube with its center of gravity downwardly. A tendency to such an orientation would be further facilitated by the upward movement of the elevator. An abutment can be provided to both prevent the tube from sliding off the cradles of the elevator as it rises and abrade against the lower end of the tube in order to vibrate it to further orient the tube with its center of gravity downwardly. The abutment can include an upper portion laterally offset from a lower portion so that, as the elevator rises, the tube will be allowed to slide downwardly within the cradles a short distance. Such sliding action further functions to orient the tube with the center of gravity downwardly.

In the preferred embodiment, the means for receiving the tube at the upper-most positioning of the elevator can comprise a manipulator apparatus which includes a tube holder for accepting the open, upwardly disposed end of the tube held in the elevator cradles. Means can be provided to move the tube into the holder when the elevator is at its upper-most position.

The holder can define a channel shaped and sized to allow passage of DIPs therethrough. The channel can be defined by a pivotally mounted trough which can be opened on its upper side. The open, upper side can be covered by a retention member biased downwardly toward the trough. The retention member can take the form of a frame pivotally biased toward the trough, an end of the frame opposite that at which it is pivoted having a wheel journaled thereto for engagement of the DIP tube.

When the elevator is at its upper-most position and the tube carried thereby is in registration with the channel formed in the trough, means for pushing the tube into the manipulator tube holder will urge the tube into the trough. With the tube received in the trough, the retention member engagement wheel will bear down on the tube to hold it within the trough.

A discard bin can be provided and be spaced laterally from the location of the elevator. The manipulator can be movable across the position of the elevator and a position above the discard bin. The manipulator can function to bring the open end of the tube into registration, if it is not already so registered, with a singulator device for dispensing DIPs to the test site. With the open end of the tube in registration with the singulator, the tube can be tipped by the manipulator so that the open end of the tube is downwardly and the DIPs therein can pass to the singulator.

Once a tube is empty, the manipulator can be moved to a position above the discard bin. With the manipulator at that location, it can be tilted back downwardly. Means can be provided to withdraw the retention member and release the tube so that it can fall into the discard bin.

In a preferred embodiment, the release means can comprise a camming surface carried by the manipulator. The camming surface functions in combination with a plunger carried by the tube holder so that the plunger, normally biased to a position wherein the retention member will be in its normally biased closed position, will ride up on the camming surface and lift the retention member in order to release the tube.

The present invention is, therefore, an automatic load and feed apparatus for an integrated circuit handler. As will be seen, such a device in accordance with the invention solves many of the problems of the prior art. More specific features and advantages obtained in view of those features will become apparent with reference to the DETAILED DESCRIPTION OF THE INVENTION, the appended claims, and the accompanying drawing figures.

BRIEF DESCRIPTION OF THE DRAWINGS

FIG. 4 is an elevational view taken generally along the line 4—4 of FIG. 2 and illustrating an elevator mechanism approaching a position at which a DIP tube is picked up;

FIG. 5 is a view similar to FIG. 4, some portions thereof being broken away;

DETAILED DESCRIPTION OF THE INVENTION

Figure 1:
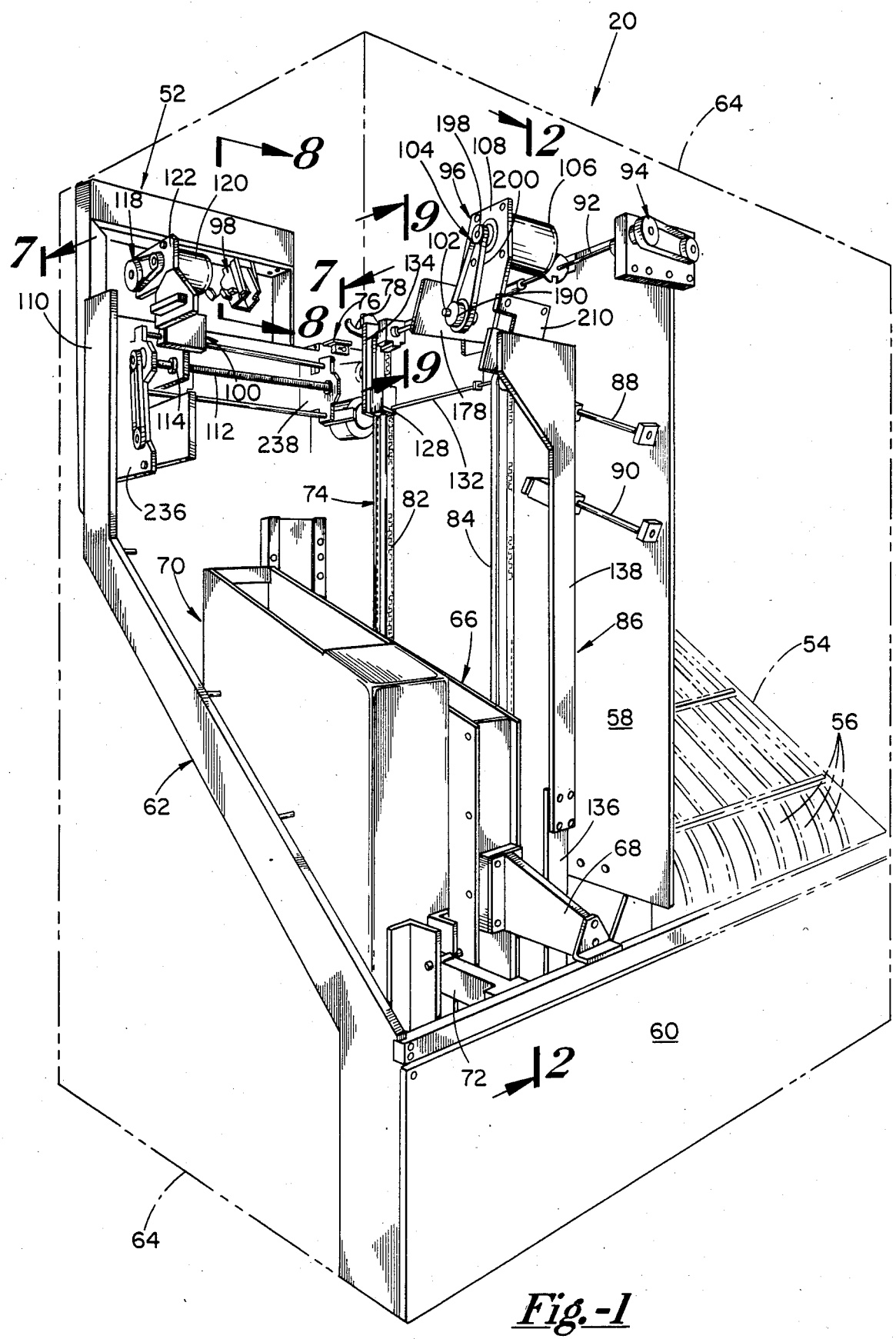
FIG. 1 is a perspective view of a handler incorporating the present automatic load and feed apparatus invention.
Figure 6:
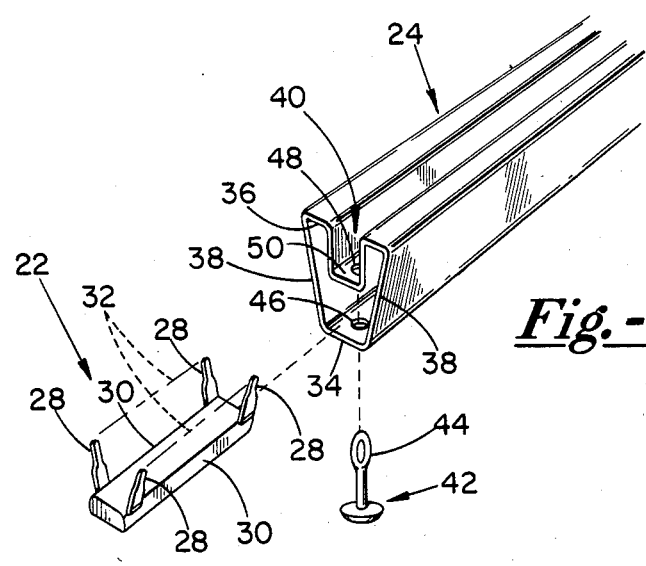
FIG. 6 is a perspective view of a DIP, and a DIP transportation and storage tube and associated closure pin as known in the prior art.

Referring now to the drawings wherein like reference numerals denote like elements throughout the several views, FIG. 1 illustrates a handler 20 for feeding integrated circuit devices—and, more specifically, dual-in-line package devices (DIPs) 22—to a test site (not shown) at which the devices 22 are interfaced with a tester for qualitatively ascertaining the reliability of the devices 22. FIG. 6 illustrates a DIP 22 of the type which is processed by the handler 20 and a transportation and storage tube 24 in which a plurality of such devices 22 are stored. The DIP 22 includes a main body portion 26 and a plurality of contact elements 28 extending generally perpendicularly from each of opposite elongated edges 30 of the main body portion 26. The contacts 28 are flared slightly so that rows on opposite sides of the main body portion 26 diverge slightly from one another. It will be understood that, although only end contact elements 28 of each row are illustrated, a number of intermediate elements can be, and usually are, included. The phantom lines 32 extending between the end contact elements 28 in each row show where the extremities of the plurality of contact elements 28 would be positioned.

A typical transportation and storage tube 24 has a cross section whose periphery is generally trapezoidal. The cross section of the tube 24 is, therefore, generally congruent to an outline of the DIPs 22 to be stored therein. The smaller 34 of parallel sides 34, 36 of the tube 24 is designed to have received adjacent thereto the main body portion 26 of the DIP 22. The contact elements 28 of the DIP 22 flare outwardly along the nonparallel walls 38 of the tube 24. The longer 36 of the parallel sides 34, 36 has, formed therein, a depression 40 which functions to extend between the rows of contact elements 28. The DIPs 22 within such a tube 24 are, thereby, maintained in a defined orientation relative to the tube 24.

As seen in FIG. 6, a pin 42 having an enlarged, flexible portion 44 can be inserted through aligned apertures 46, 48 in the smaller parallel wall 34 and in the bottom wall 50 of the depression 40 in order to close the end of the tube 24 once DIPs 22 are received therewithin. It will be understood that each of opposite ends of the tube 24 is of a similar construction. As a result, either end can be opened by withdrawing the pin 42, while the opposite end is maintained in an occluded configuration.

Referring again to FIG. 1, the handler 20 illustrated includes an input side 52 and an output side 54. Classification bins 56 to which the DIPs 22 are directed after testing are seen on the output side 54. Various other structural elements are included on the output side 54 but are not visible because of a dividing wall 58. It will be understood, however, that the present invention relates exclusively to the input side 52 of the handler 20.

As seen in FIG. 1, a lower rear wall 60 traverses the length of the handler 20 at the back end thereof. A cantilevered side member 62 extends forwardly and upwardly from this rear wall 60 to support various other structural elements at its upper end. Although such structure is shown in the drawings, any other support and enclosing structure could be utilized for such a handler. In fact, phantom lines 64 in FIG. 1 illustrate the boundaries of a cabinet which would totally enclose both sides of the handler 20.

A DIP tube hopper 66 is shown as being mounted to the rear wall 60 by an appropriate mounting bracket 68. Similarly, a tube discard bin 70 is also shown as mounted to the rear wall 60 by a mounting bracket 72. Spaced laterally from the hopper 66 in a direction away from the tube discard bin 70 is an elevator 74 by which tubes 24 extracted from the hopper 66 are raised upwardly to a height wherein an elevated, open end of the tube 24 is disposed above the entrance to a singulator 76. Such a singulation device 76 functions to govern the flow of devices 22 in a tube 24 to a test site or test sites at which the DIPs 22 are tested.

As seen in FIG. 1, the elevator 74 includes a pair of cradles, only a forward of said cradles 78 being seen in the figure, each being mounted to an endless drive means 82, 84. The cradle 78 of the forward elevator drive means 82 would be disposed at a location above that of the cradle of the rearward elevator drive means 84. The drive means 82, 84 would be activated simultaneously and at the same speed so that the forward cradle 78 would always remain above the rearward cradle. As a result, the forward end of a tube 24 held in the forward cradle 78 and the rearward cradle would be elevated to dispose the tube 24 obliquely. Consequently, with the forward end closure pin 42 removed, DIPs 22 would remain within the tube 24.

FIG. 1 also illustrates a tube guide assembly 86. Such an assembly 86 would be supported generally vertically by means of a pair of adjustment support shafts 88, 90 secured by appropriate means to the dividing wall 58 between the input and output sections 52, 54 of the handler 20. The fore/aft positioning of the tube guide assembly 86 can, thereby, be varied. The lower, rearward end of a tube 24 being raised by the elevator 74 engages the tube guide assembly 86 and the tube 24 is, thereby, prevented from sliding out of the forward cradle 78 and the rearward cradle.

Elevator raising and lowering is effected by initiating rotation of a shaft 92 which can mount gears or other appropriate drive sprocket type structure at upper ends of the elevator drive mechanisms 82, 84. Rotation can be imparted to the shaft 92 by a pulley/belt arrangement 94.

When a tube 24 raised by the elevator 74 is at its upper-most location, it can be engaged by a tube inserter mechanism 96 to urge the tube 24 into the tube holder 98 of a manipulator device 100. Operation of the tube inserter 96 can be initiated by the rotation of a shaft 102 driven by a pulley/belt arrangement 104 caused to rotate by a motor 106 mounted to a wall 108 of the inserter 96.

The manipulator 100 is mounted proximate the upper end 110 of the cantilevered member 62. It is disposed for lateral movement along a rotatable lead screw 112 and has a gear follower 114 to translate the rotational motion of the screw 112 into lateral movement of the manipulator 100.

The manipulator 100 carries a tube holder 98 which is mounted for pivoting about the axis of a shaft 116. Rotation is effected by causing the shaft 116 to rotate by means of a pulley/belt assembly 118 and motor means 120 mounted to a plate 122 of the manipulator 100.

Figure 2:
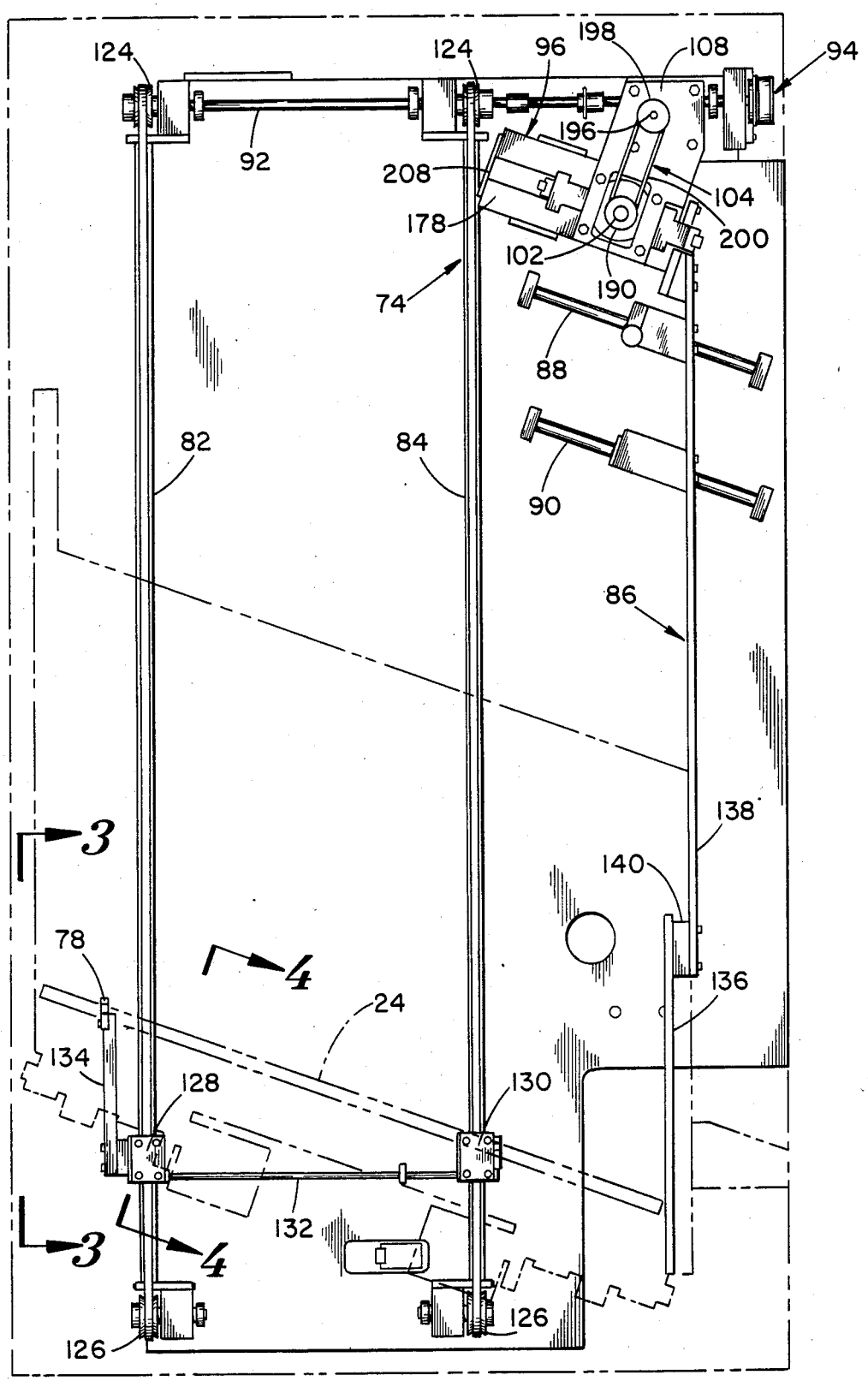
FIG. 2 is a side elevational view taken generally along the line 2—2 of FIG. 1.

FIG. 2 illustrates in more detail the relationship and operation of the elevator 74 and the tube inserter 96. As can better be seen in FIG. 2, the elevator 74 includes forward and rearward drive mechanisms 82, 84. Each mechanism can comprise an endless rubberized belt extending over upper and lower pulleys 124, 126. The upper pulleys 124 are, as previously indicated, carried by the elevator drive shaft 92 for rotation therewith. As the shaft 92 is rotated, the upper pulleys 124 will, in turn, rotate therewith. The inner surface of the belts can be textured or provided with teeth meshable with teeth on the pulleys 124, 126 in order to insure that the rotation of the pulleys 124 is, in turn, translated to the belts.

Each belt has affixed thereto a cradle carrier 128, 130. Each of these cradle carriers 128, 130 is affixed to its respective belt at approximately the same height, and a connecting bar 132 is provided to prevent rotation of the cradle assemblies and insure their relative correspondence. That is, if one belt is driven, but, for some reason, the other isn't, the interconnecting bar 132 will insure that the other, non-driven cradle carrier will also be raised as is the driven carrier.

The forward of the carriers 128 mounts a vertical extension 134 in order to elevate the cradle 78 carried thereby. As can be seen then, the forward cradle 78 will be at a location elevated with respect to the rearward cradle 80.

FIG. 2 shows, in phantom, a DIP tube 24 seated in the forward and rearward cradles 78, 80. With the tube 24 maintained in such an oblique orientation, the upwardly disposed end of the tube 24 would have previously been opened by removing the retaining pin 42 therefrom. As will be seen hereinafter, the removal of such pin 42 will have occurred prior to placement of the tubes 24 in the hopper 66 from which they are translated to the elevator 74.

The tube guide assembly 86 is also illustrated in FIG. 2 and, as can be seen, it is positioned by adjusting it forwardly and rearwardly (depending upon the length of the tubes being handled) so that the rearward and lower end of the tube 24 engages a lower portion 136 of the assembly 86. The assembly 86 comprises said lower portion 136 and an upward portion 138 spaced rearwardly from the lower portion 136 by a spacer block 140. As previously indicated, the assembly 86 is mounted to the dividing wall 58 between the input and output sides 52, 54 of the handler 20 and can be adjusted forwardly and rearwardly by appropriate means.

As the elevator 74 raises a tube 24, the rearward end of the tube 24 eventually passes the upper most end of the tube guide assembly 86. Shortly after the end of the tube 24 passes this upper end of the assembly 86, the elevator 74 is in its uppermost position. With the elevator 74 in this position, the rearward end of the tube 24 is engaged by a pusher member 142 of the tube inserter 96. The pusher member 142 is disposed for reciprocation substantially along an axis along which the tube 24 is aligned. When it is sensed, by appropriate sensing means that the elevator 74 is at its uppermost position and that the tube 24 is engaged by the pusher member 142, the pusher member 142 will be actuated to move the tube 24 leftwardly and upwardly as seen in FIG. 2.

Figure 3:
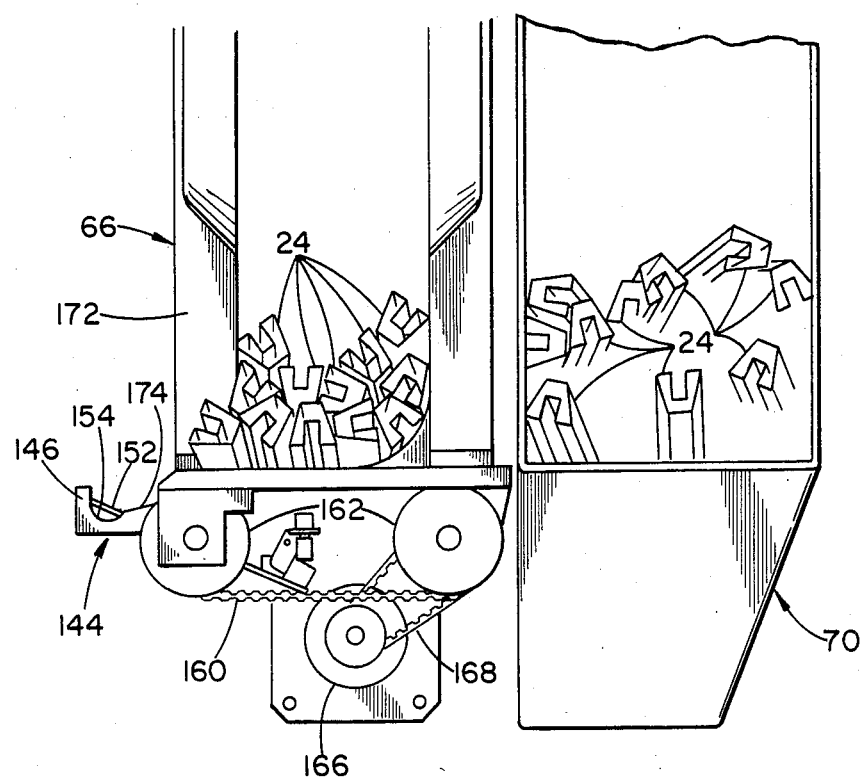
FIG. 3 is an enlarged elevational view taken generally along the line 3—3 of FIG. 2.

FIGS. 3, 4, and 5 illustrate components for initially receiving and motivating DIP tubes 24. FIG. 3 illustrates the side-by-side disposition of the dispenser hopper 66 and the discard bin 70. It will understood, however, that this particular relationship of these two structures is not exclusive.

FIG. 5 illustrates the construction of a pick-up member 144 mountable beneath the hopper 66. The pick-up member 144 includes a concave bed receptacle 146 extending laterally, when the pick-up member 144 is mounted to the hopper 66, from the hopper 66 itself. The pick-up member 144 can be mounted to the hopper 66 by inserting an appropriate affixation element (not shown) through an aperture 148 formed in the pick-up member 144 and into a receptacle (not shown) in the hopper 66.

The pick-up member 144 further includes a tab 150 pivotally mounting an elongated member 152 having a first end obstructing the bed 154 and a second end mounting a flag 156. The pick-up member 144 can further include a LED type transmitter and receptor assembly 158. When a DIP tube 24 is received in the concave receptacle of the bed 154, the presence of the tube 24 will cause the elongated member 152 to be pivoted to urge the flag 156 carried by the member 152 into a position occluding communication between the transmitter and receptor of the LED 158.

FIG. 3 illustrates a condition wherein the bed 154 of the pick-up member 144 is unoccupied by a DIP tube 24. Consequently, the flag 156 does not eclipse the transmitter.

FIGS. 3 and 4 illustrate drive means for urging randomly disposed DIP tubes in the hopper 66 laterally into the bed 154 of the pick-up member 144. An endless belt 160, serrated to mesh with similar serrations formed in outer surfaces of a pair of drive wheels 162, extends around the drive wheels 162. The wheels 162 are disposed for rotation about generally parallel axes. When the belt 160 is engaged with the outer surfaces of the wheels 162, an upper run 164 of the belt 160 forms a portion of the floor of the hopper 66. Rotation of the belt 160 by activation of a drive motor 166 and transmission means 168 interconnecting the drive motor 166 and the rightmost of the two wheels 162 about which the belt 164 extends will urge a DIP tube 24 closest to an aperture 170 formed in a left side wall 172 of the hopper 66, through that aperture 170, onto a slide surface 174 of the pick-up member 144 and into the bed 154 thereof. Because the center of gravity of a tube 24 is more closely proximate the shorter 34 of opposite parallel sides 34, 36 in view of the main body portions 26 of the DIPs 22 carried therein being closely proximate that side, the tube 24 will tend to orient itself with the shorter 34 of these parallel sides 34, 36 downwardly as the tube 24 slides into the contour of the bed 154. This orienting of the tube 24, when used with a tube holder 98 as described hereinafter, can be important in order to effect proper mating of the tube 24 with the holder 98.

As previously discussed, when a tube 24 is received within the bed 154 of the pick-up member 144, the flag 156 carried by the elongated member 152 will eclipse communication between the transmitter and the receptor. A signal will, thereby, be sent to a microprocessor (not shown) which will, in turn, initiate upward movement of the elevator 74. The cradle 78 illustrated in FIG. 4 is offset from the bed 154 of the pick-up member 144 along a rearwardly/forwardly extending axis so that, as the elevator 74 rises, the cradle 78 will not engage the bed 154 of the pick-up member 144.

It will be understood that if desired, a pair of pick-up members 144 and endless belts 160 as illustrated in FIG. 4 can be employed so that lateral movement of a tube 24 will be effected along its length. There can, therefore, be a pair of pick-up member beds 154 corresponding, respectively, to the pair of elevator cradles 78, 80.

As the cradles 78, 80 rise they will lift the tube 24 from the pick-up member 144 and continue to raise it upwardly until the upper end of the tube 24 is above the entrance to the singulator 76. As in the case of the use of optics in order to ascertain the presence of a tube 24 in the pick-up member bed 154, similarly, optics can be used at various other stages of operation of the structures described thus far. For example, optics can be utilized to determine that the elevator 74 has risen to its uppermost position.

Figure 9:
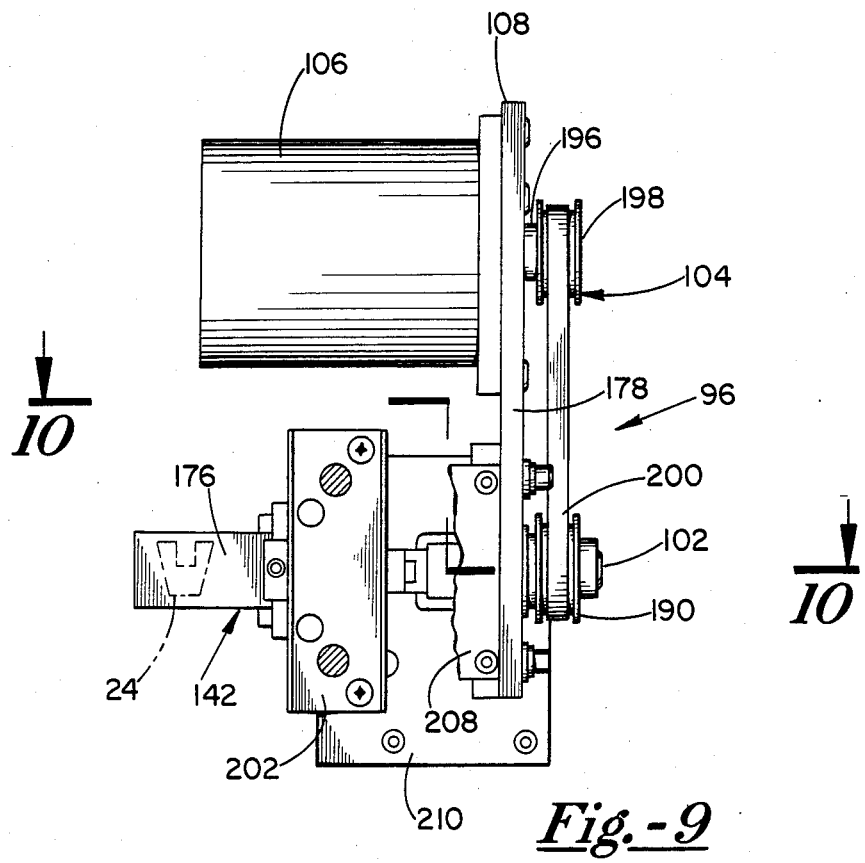
FIG. 9 is an elevational view of the DIP tube pusher mechanism taken generally along the line 9—9 of FIG. 1.
Figure 10:
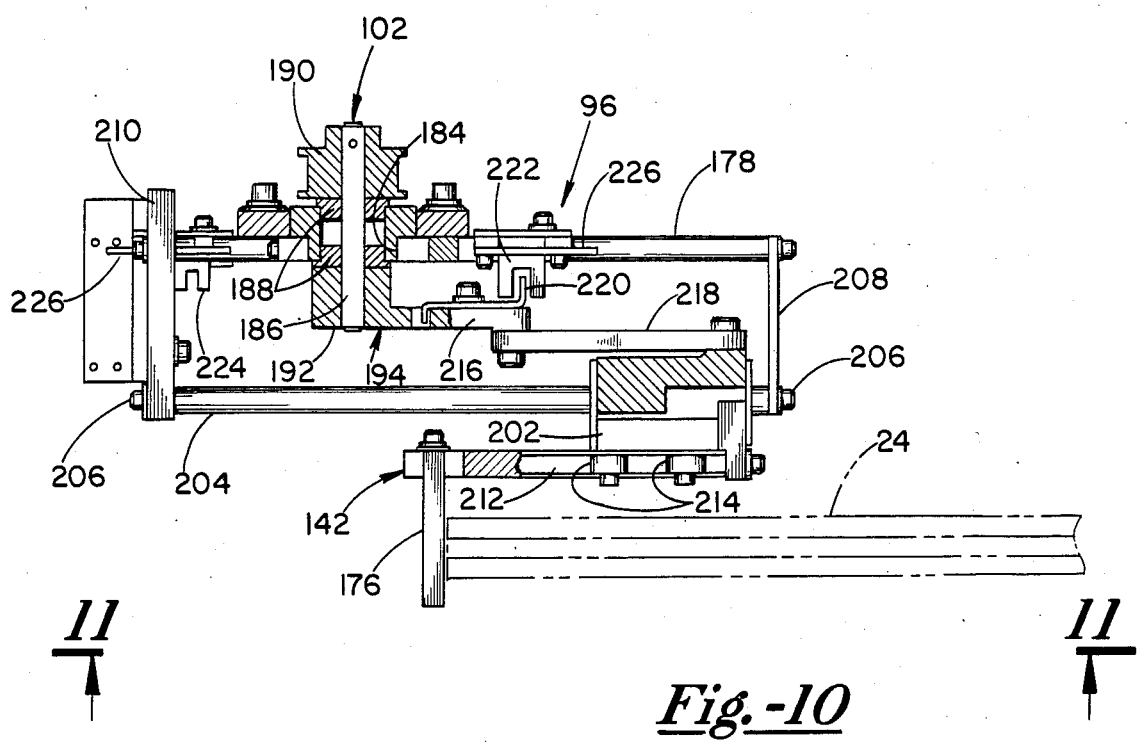
FIG. 10 is a top sectional view taken generally along the line 10—10 of FIG. 9.
Figure 11:
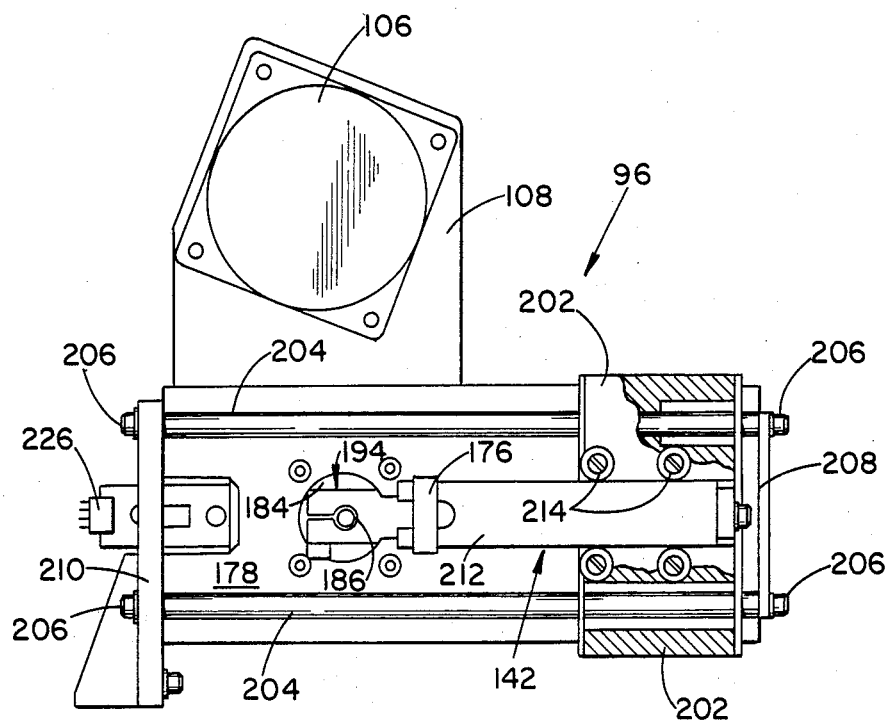
FIG. 11 is a side elevational view taken generally along the line 11—11 of FIG. 10, some portions thereof being broken away.

FIGS. 9, 10, and 11 illustrate the tube inserter 96 in more detail. As the elevator 74 reaches its highest point, the rearward end of the DIP tube 24 will be engaged by a paddle 176 of a pusher member 142 of the tube inserter 96 as seen in phantom in FIG. 9. This paddle 176 is disposed for movement along an axis aligned with the DIP tube 24 held within the elevator cradles 78, 80.

Referring now more particularly to FIGS. 10 and 11, the tube inserter 96 includes a mounting rack 178 at one side of the inserter assembly 96. As seen in FIG. 9, the mounting rack 178 includes an upward extension wall 108 to which a drive motor 106 is affixed. The mounting rack 178 has an aperture 184 formed therethrough, and an axle 186 passes through the aperture 184 and is fixed generally centrally within the aperture 184 by a pair of bearings 188.

An outer end of the axle has mounted thereto, and for rotation therewith, a pulley-like member 190. The opposite end of the axle, similarly, has mounted thereto, and for rotation therewith, the hub 192 of a crank assembly 194. As seen again in FIG. 9, a stub shaft 196 of the drive motor 106 which extends through the mounting plate has a pulley-like member 198 mounted thereto. An endless drive belt 200, which can be provided with serrations for meshing with serrated teeth of the pulley-like members 190, 198 is fitted over outer surfaces of those members 190, 198. As can be seen, therefore, as the motor 106 is actuated, rotaoion of its stub shaft 196 is, in turn, translated to the pulley-like member 198 mounted to the stub shaft 196, to the pulley-like member 190 mounted to one end of the axle 186 passing through the aperture 184 in the mounting rack 178 via the endless belt 200, and, through the axle 186, to the hub 192 of the crank mechanism 194.

As best seen in FIG. 11, the pusher member 142 includes a carriage 202 which rides along a track oriented generally parallel to the axis of a DIP tube 24 seated on the elevator cradles 78, 80. FIG. 11 illustrates this track as comprising a pair of tube-stock bars 204. The bars 204 are held in place by securing bolts 206 at forward and rearward end plates 208, 210. It will be understood, of course, that the specific form which the track takes need not be exclusively that illustrated and described in this document, and that any appropriate track functioning to mount the carriage 202 for its designed movement is acceptable.

The pusher member 142 includes an extension 212 which juts rearwardly from the carriage 202, the paddle 176 being mounted generally perpendicularly to the rearward extension 212.

The rearward extension 212 can be adjustable with respect to the carriage 202 so that the forward/rearward location of the paddle 176 can vary depending upon the length of the DIP tube 24 in the forward elevator cradle and the rear cradle, and so that paddle 176 will be flush with tube guide assembly 86 when the paddle is in its retracted position. The rearward extension 212 can ride within a pair of upper rollers 214 and lower rollers (not shown) during this adjustment, and, if desired, the extension 212 can be biased relative to the carriage 202 by appropriate means such as a compression spring (not shown).

The crank assembly 194 includes a first arm 216 rigidly affixed to the hub 192 and extending radially therefrom. Further, the assembly 194 includes a second arm 218 having a first end affixed at a location on the first arm 216 radially outwardly from the axle 186 to which the hub 192 is mounted. Typically, this location would be at the radially outermost end of the first arm 216.

The second end of the second arm 218 is secured at the pusher member carriage 202. Both ends of the second arm 218 are loosely held at their points of affixation so that the angle formed between the first and second arms 216, 218 and that formed by the second arm 218 relative to the pusher member carriage 202 are variable.

As actuation of the motor 106 effects rotation of the hub 192, the first arm 216 will rotate, for example, in a clockwise direction as viewed in FIG. 11. As such rotation occurs, the distal end of the first arm 216, and, in turn, the first end of the second arm 218 will be retracted toward the rear of the tube inserter 96. Concurrently, the second end of the second crank assembly arm 218 and, in turn, the pusher member carriage 202 will also be retracted.

FIG. 10 illustrates the first arm 216 of the crank assembly 194 as carrying a flag member 220. The mounting plate 178 of the tube inserter 96 can mount a pair of LED transmittor/receptor assemblies 222, 224. A rearward 224 of these assemblies is positioned at a forward-/rearward location wherein, when the paddle 176 is at its rearward-most location (one at which it will be disposed prior to the time that the elevator 74 raises a DIP tube 24 to be pushed by the tube inserter 96), the flag 220 will eclipse the transmittor of this rearward LED assembly 224. The microprocessor can be programmed so that upward movement of the elevator 74 will not be initiated unless the paddle 176 is at this rearward position.

FIG. 10 shows the crank assembly 194 in a position at which the flag member 220 eclipses the transmittor of the second, forward LED assembly 222 transmittor. With the flag 220 in this position, the paddle 176 is at the forward end of its stroke, and a DIP tube 24 engaged by the paddle 176 will be received within the tube holder 98 of the manipulator 100.

The tube inserter 96 can carry various electrical connections 226 by which information from the LED assemblies 222, 224 can be transmitted to the microprocessor. These connectors 226 can be constructed as pronged plugs void of cables so that the tube inserter 96 can be removed, if desired, from the handler 20 without being required to carry unnecessary lengths of cables therewith.

Figure 7:
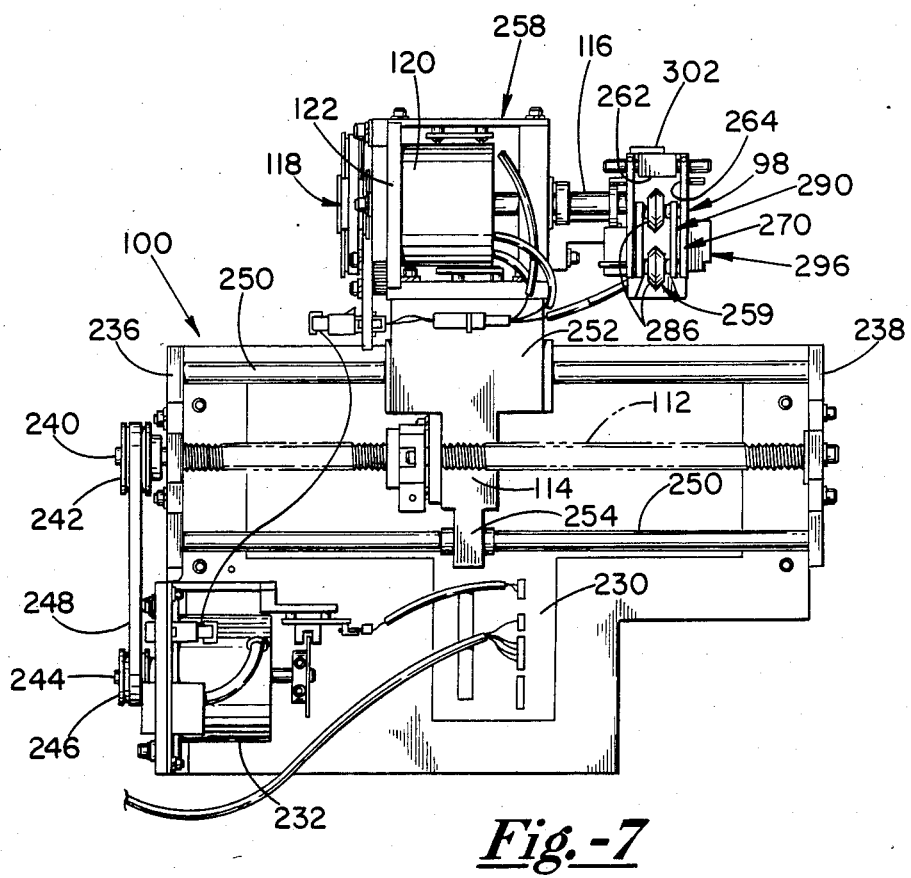
FIG. 7 is an elevational view of the manipulator taken generally along the line 7—7 of FIG. 1.

Referring now to FIGS. 7, 8, 12, and 13, the tube holder 98 into which the DIP tube 24 is pushed by the tube inserter 96 is illustrated. In FIG. 7, that holder 98 is illustrated as mounted to the manipulator assembly 100.

Referring first, specifically, to FIG. 7, the manipulator 100 is carried by an upper structural mount 228. The mount 228 carries a printed circuit board 230 which functions as a terminal for information from a motor 232 for driving a lead screw 112, a motor 120 for rotating the tube holder 98, and various sensors which ascertain the positioning of the manipulator 100 along the lead screw 112, the number of rotations of the lead screw driving motor 232 sensed, etc.

The structural mount 228 includes a pair of end plates 236, 238 between which the lead screw 112 is journalled. An extension 240 of the lead screw 112 beyond a left of the end plates 236, as viewed in FIG. 7, mounts a pulley-like member 242. Similarly, a stub shaft 244 from the lead screw drive motor 232 extends axially beyond end plate 236 and mounts another pulley-like member 246. An endless belt 248 extends around the outer surfaces of these pulley-like members 242, 246 to translate the rotational motion of the motor 232 to the lead screw 112.

The end plates 236, 238 of this structural mount 228 are illustrated as having a pair of rods 250 extending there-between, one above and one below the lead screw 112. These rods 250, together, comprise a track along which the manipulator 100 is driven by the lead screw 112. Upper bearings 252 of the manipulator 100 rides along the upper rod, and a lower bearing 254 of the manipulator 100 rides along the lower rod. The manipulator 100 further includes a drive nut 114 which rides on the lead screw 112.

An upper housing 258 of the manipulator 100 encloses motor 106 which functions to effect rotation of the tube holder 98 via shaft 116. The shaft 116 is, in effect, an extension of a stub shaft of the motor 120.

Figure 8:
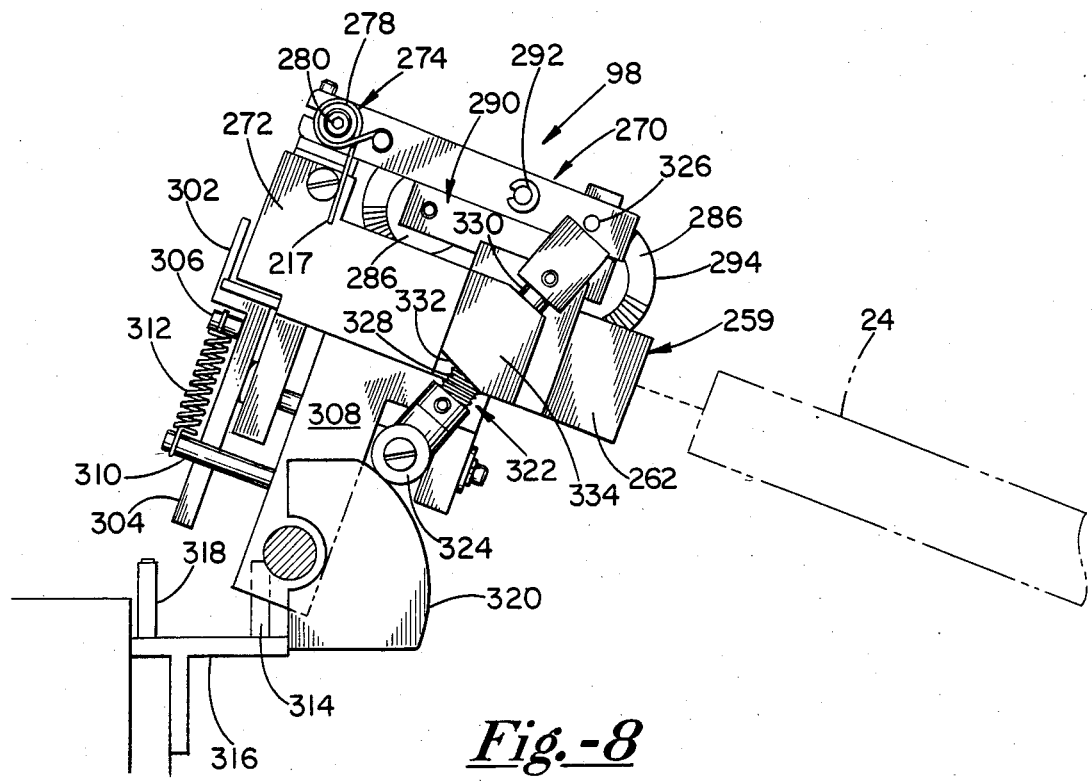
FIG. 8 is an elevational view of the tube holder mechanism taken generally along the line 8—8 of FIG. 1, a DIP tube being shown in phantom.
Figure 12:
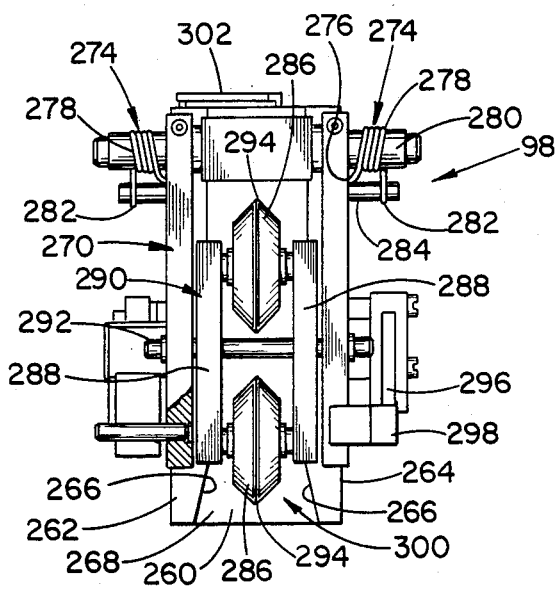
FIG. 12 is a top plan view of a tube holder.
Figure 13:
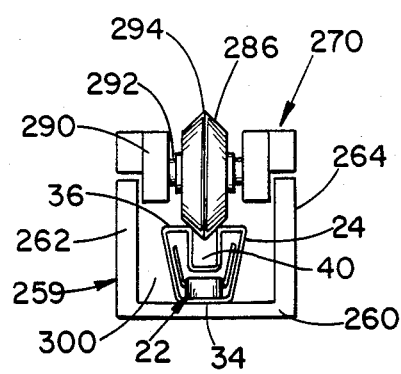
FIG. 13 is a side elevational view of the tube holder of FIG. 12 with a DIP tube being received within a trough of the holder.

Referring now to FIGS. 8, 12, and 13, the tube holder 98 comprises a trough 259 having a floor 260 and upwardly extending sides 262, 264. The inner side walls at the end of the trough facing the direction from which the DIP tube 24 urged into the trough 259 by the tube inserter 96 are flared outwardly, as at 266, to allow for small errors in alignment of the tube 24. The beveling of these walls 262, 264 will deflect the open end of the tube, as it is urged into the trough 259, to a center, aligned position.

The manipulator 100 is mounted at a height relative to the elevator 74 so that, when the elevator cradles 78, 80 carry a DIP tube 24, the DIP tube 24 is at an upper most position of the elevator 74, and the tube holder 98 is at a predetermined angle, the pusher member 142 of the tube inserter 96 can ram the tube 24 into the trough 259 so that it is substantially at the floor 260 thereof. It will be understood that, if desired, the end of the trough floor 260 can also be beveled, as at 268, slightly to allow for slight errors in positioning.

The tube holder 98 further includes a retention member comprising a frame having dual arms 270 pivotally mounted at one end thereof to an upward extension 272 of the trough 259. The frame is biased pivotally downwardly toward the trough 259 by a wire spring 274 biasing either one or both of the frame arms 270 downwardly. Each spring 274 has a first end 276 held at the trough 259, a main portion 278 which extends about a shaft 280, and a second end 282 which bears downwardly on a pin 284 extending laterally from the respective frame arm 270.

Remote from the shaft 280 about which the frame arms 270 rotate, the arms carry an engagement wheel 286 journaled therebetween. The figures illustrate a pair of such wheels 286 aligned generally along an axis parallel to the direction of movement of the tube 24 into the trough 259. It will be understood that, although a single wheel can function to hold a DIP tube 24 within the trough 259, more efficient retention is accomplished when a pair of wheels 286 is used.

FIG. 12 illustrates each of the pair of wheels 286 journaled between a pair of generally parallel walls 288 of a balancing element 290. The walls 288 are, in turn, mounted to a shaft 292 extending therethrough and outwardly through the side walls 270 of the trough 259. By using such a balancing element 290, equal pressure can be brought to bear upon the DIP tube 24 by each of the engagement wheels 286.

As seen in FIG. 13, the engagement wheels 286 can be apexed centrally. By so structuring the wheels 286, they can serve a function of centering the tube 24 within the trough 259. The apex 294 of each wheel 286, after being fitted into the depression 40 formed in the longer 36 of the two parallel sides 34, 36 of the DIP tube 24, will urge the tube 24 laterally one way or another in order to seek the center of the depression 40.

Means can be provided for ascertaining whether a DIP tube 24 is received within the trough 259. A contact switch 296 can be provided on one side of the trough 259 to function so that, when a tube 24 is received therein and the downward bias of the retention member is, to a degree, overcome, a lateral protrusion 298 from the retention member will release the switch 296 and allow it to disengage.

A rear end of a channel 300 defined by the trough 259 can be alternately occluded and unobstructed by a closure plate 302 so that, as the tube holder 98 is pivoted upwardly, flow of DIPs 22 through the channel 300 can be controlled until the channel 300 is in registration with the singulator 76. The closure plate 302 is best illustrated in FIG. 8.

The closure plate 302 can include a mounting arm 304 secured to the bottom of the trough 259 for rotation between a first position, in which the channel 300 is occluded, and a second position, in which the channel 300 is unobstructed. The mounting arm 304 of the closure plate 302 can include a post 306, and, similarly, the arm 308 by which the tube holder is pivoted can include a post 310. A spring 312 can be extended between these two posts 306, 310 to urge the mounting arm 304 of the closure plate 302 into either one or the other of the positions it occupies when the closure plate 302 is in its occluding and unobstructing positions, respectively, depending upon the direction in which the mounting arm 304 is urged.

When the trough 259 is in registration with a tube 24 at the upper-most elevator position, the closure plate 302 will occlude the trough channel 300. Once the tube 24 is rammed into the trough channel 300 of the tube holder 98, the microprocessor will sense that the paddle 176 is in a position as illustrated in FIG. 10 because of the optics carried by the tube inserter 96. Additionally, the microprocessor will sense that the contact switch 296 carried by the trough 259 has been opened as a result of the retention member arms 270 being lifted from their normal, downwardly biased position.

The microprocessor will, in turn, send a signal to the manipulator motor 120 directing it to rotate the tube holder 98 to an almost vertical position in which it can be brought into registration with the singulator 76. Optics can be provided to the manipulator 100 to sense the positioning of the tube holder 98 and the DIP tube 24 it carries.

When it is sensed that the tube 24 is in its almost vertical position, the microprocessor will direct the lead screw motor 232 to rotate the lead screw 112 in order to drive the manipulator 100 laterally to the right, as viewed in FIG. 7, to a position at which the tube holder 98 is disposed at a location at which the channel 300 is in registration with the singulator 76. As the tube holder 98 approaches this position, the closure plate mounting arm 304 is positioned so that it will not be obstructed by a first, generally vertically extending post 314 carried by the handler frame 316 as the manipulator 100 moves laterally. As the manipulator 100 closely approaches a position at which the tube holder 98 is in registration with the singulator 76, however, the distal end of the closure plate mounting arm 304 engages a second generally vertically extending post 318 mounted to the handler frame 316. As the tube holder 98 is finally brought into registration with the singulator 76, the post's engagement by the mounting arm 304 will urge the mounting arm 304 to a position so that the closure plate 302 does not obstruct passage of DIPs through the trough channel 300.

With the closure plate 302 not obstructing passage of the DIPs through the channel 300, the DIPs will enter the singulator 76 and be cycled to the test site. When it is determined by appropriate sensing means that the tube 24 is empty of DIPs, the microprocessor will direct the lead screw motor 232 to drive the lead screw 112 in order to urge the manipulator 100 leftwardly, as viewed in FIG. 7, to a position at which the tube holder 98 is above the tube discard bin 70. As the manipulator 100 moves laterally, the mounting arm 304 of the closure plate 302 will be in a position where it can engage the first generally vertically extending post 314 carried by the handler frame 316, and that post 314 will urge the mounting arm 304 back to its original position wherein the closure plate 302 occludes the trough channel 300.

When it is sensed by appropriate sensing means, such as optics, that the manipulator 100 is in a position wherein the tube holder 98 is above the discard bin 70, the microprocessor will direct the manipulator motor 120 to rotate the tube holder 98 downwardly. As seen in FIG. 8, the manipulator 100 carries a camming surface 320, and the tube holder 98 carries a plunger 322. The plunger 322, at its lower end, has a roller 324 mounted thereto. At its upper end, the plunger 322 engages a pin 326 extending laterally from the retention member arms 270.

As the tube holder 98 continues to be rotated downwardly, the roller 324 mounted at the lower end of the plunger 322 will ride up over the camming surface 320 carried by the manipulator 100. The plunger 322 is normally urged to a downward position by the pin 326 which its upper end engages, since the retention member arms 270 are biased downwardly into the trough 259. Further biasing means can be carried by the plunger 322, however, to more positively urge it to its downwardly position. A spring 328 slid over the plunger shaft 330 and engaging a shoulder 332 defined by a mount 334 carried by the trough 259 and a shoulder 336 above the roller 324 can be provided for this purpose.

When the roller 324 rides up on the camming surface 320 carried by the manipulator 100, the bias of the spring 328 about the plunger shaft 330 and that of the springs 274 urging the retention member arms 270 downwardly will be overcome to lift the retention member (and, specifically, the engagement wheels 286) from the upper surface of the DIP tube 24. The tube 24 will, thereby, be released and will be allowed to fall into the discard bin 70.

Once the tube 24 carried by the tube holder 98 is discarded into the discard bin 70, the manipulator 100 can be directed to return to its first position for receipt of another DIP tube. The operational sequence can then be re-performed for that DIP tube and additional DIP tubes until the hopper is empty.

Numerous characteristics and advantages of the invention for which this document has been prepared have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined by the language in which the appended claims are expressed.

What is claimed is:

1. Apparatus for feeding dual-in-line package (DIP) integrated circuit device transportation tubes, configured with one of opposite ends thereof opened, to mating with a singulator mechanism by which DIPs in the tubes are, after passing out through the open end of a tube, individually released into a chute to pass to a site at which the DIPs are interfaced with an electronic tester, comprising
    (a) a dispensing hopper for receiving a plurality of the tubes, said hopper having a side wall enclosing tubes therein with open ends thereof disposed above their opposite ends, and an aperture formed in said side wall proximate a lower end thereof to afford egress from said hopper to said tubes;
    (b) means spaced laterally from said aperture in said hopper side wall for elevating a tube, with the open end thereof disposed above its opposite end to a height at which its open end is positioned above the height of the singulator;
    (c) means for urging a tube in said hopper through said egress aperture and translating the tube to said elevating means; and
    (d) means for receiving a tube elevated to said height at which its open end is positioned above the height of the singulator and for tilting the tube to allow DIPs therein to pass into the singulator.

2. Apparatus in accordance with claim 1 wherein said elevating means comprises a pair of cradles onto which the tube can be received, a first of said cradles being disposed at a height below a height at which a second of said cradles is disposed, wherein a vertical separation of said cradles is defined in order to maintain the open end of the tube above its opposite end, said cradles being raisable concurrently so that said vertical separation can be maintained constant.

3. Apparatus in accordance with claim 2 wherein a DIP filled transportation tube has a generally trapezoidal cross-section and a center of gravity closer to a shorter of parallel sides defined by the crosssection, and wherein each of said cradles has a concave receptacle formed therein to receive a tube.

4. Apparatus in accordance with claim 3 further comprising pick-up means into which a tube urged through said egress aperture and translated laterally can be deposited, said cradles being raisable to lift a tube deposited into said pick-up means upwardly from said pick-up means.

5. Apparatus in accordance with claim 4 wherein said pick-up means further includes means for sensing that a tube has been deposited therein, and wherein upward movement of said cradles is responsive to sensing that a tube has been deposited in said pick-up means.

6. Apparatus in accordance with claim 3 further comprising means for vibrating a tube as it is raised by said cradles so that it becomes oriented with said shorter of said cross-sectional parallel sides downwardly.

7. Apparatus in accordance with claim 6 further comprising an abutment for engaging the end of a tube opposite its open end to maintain said tube on said cradles as they are raised.

8. Apparatus in accordance with claim 7 wherein said vibrating means comprises said abutment, and wherein an upper portion of said abutment is laterally offset from a lower portion thereof.

9. Apparatus in accordance with claim 1 wherein said urging means comprises an endless belt, an upper run of which defines a portion of a floor of said hopper.

10. Apparatus in accordance with claim 1 wherein said receiving means includes a manipulator having a tube holder for accepting the open end of a tube and holding said open end therein, said holder defining a channel therethrough through which DIPs in the tube can pass to the singulator when the tube is tilted.

11. Apparatus in accordance with claim 10 wherein said tube holder comprises a pivotably mounted trough open on one side and a retention member closing said trough on said open side thereof, and wherein said retention member is movable toward and away from said trough and biased toward said trough.

12. Apparatus in accordance with claim 11 wherein said trough includes a pair of lateral walls and said retention member comprises a frame, pivotally mounted to at least one of said lateral walls for movement toward and away from entry into said trough, and an engagement wheel journaled to said frame proximate an end thereof opposite an end at which the frame is pivotally mounted.

13. Apparatus in accordance with claim 11 further comprising means for pushing a tube, when its open end is positioned above the height of the singulator, axially into said trough to overcome the biasing of the retention member toward said trough, and wherein, when said tube is received in said trough, said retention member bears down upon said tube to hold said tube as it is tilted to allow DIP's therein to pass into the singulator.

14. Apparatus in accordance with claim 11 further comprising a tube discard bin, and wherein said manipulator is movable laterally between a position, at which it can receive a tube from said elevating means, and a position at which said tube holder is disposed above said discard bin.

15. Apparatus in accordance with claim 14 further comprising means, when said tube holder is disposed above said discard bin, for releasing said tube from said holder.

16. Apparatus in accordance with claim 15 wherein said releasing means comprises a camming surface carried by said manipulator and a plunger carried by said tube holder, said plunger being movable between a normal retracted position and an extended position in which it moves said retention member away from said trough when a rider carried by said plunger rides up on said camming surface, said camming surface being disposed relative to said rider so that, as said trough is pivoted to an orientation to discharge the tube into the discard bin, said rider engages and rides up on said camming surface.

17. Apparatus for feeding dual-in-line package (DIP) integrated circuit transportation tubes, configured with one of opposite ends thereof opened, into communication with a singulator mechanism by which DIPs in the tubes are, after passing out through the open end of a tube, individually released into a chute to pass to a site at which the DIPs are interfaced with an electronic tester, comprising:

(a) a hopper in which a plurality of tubes can be placed with open ends thereof disposed above their opposite ends, said hopper providing means for egress therefrom, proximate a bottom thereof, to said tubes;

(b) means spaced laterally from said hopper for elevating a tube to a height at which its open end is positioned above the height of the singulator;

(c) means for urging a tube from the hopper to said elevating means; and (d) means for receiving a tube elevated to the height at which its open end is positioned above the height of the singulator and for tilting the tube to allow DIPs therein to pass into the singulator.

18. Apparatus for feeding dual-in-line package (DIP) integrated circuit transportation tubes, configured with one of opposite ends thereof opened, into communication with a singulator mechanism by which DIPs in the tubes are, after passing out through the open end of a tube, individually released into a chute to pass to a site at which the DIPs are interfaced with an electronic tester, comprising:

(a) a dispensing hopper for receiving a plurality of tubes, said hopper having a side wall enclosing said tubes therein with open ends of said tubes disposed above their opposite ends, and an aperture formed in said side wall proximate a lower end thereof to afford egress from said hopper to said tube;

(b) means spaced laterally from said aperture in said hopper side wall for elevating a tube, with the open end thereof disposed above its opposite end, to a height at which its open end is positioned above the height of the singulator;

(c) means for urging a tube in said hopper through said egress aperture and translating the tube to said elevating means;

(d) means for receiving a tube elevated to the height at which its open end is positioned above the height of the singulator;

(e) means for pushing a tube, when its open end is positioned above the height of the singulator, into said receiving means; and (f) means for pivoting said receiving means to tilt the tube in order to allow DIPs therein to pass into the singulator.

* * * * *